United States Patent [19]

Johnson et al.

[11] 4,330,170
[45] May 18, 1982

[54] LOW-LOSS STAR COUPLERS FOR OPTICAL FIBER SYSTEMS

[75] Inventors: Derwyn C. Johnson, Ottawa; Brian S. Kawasaki, Carleton Place; Kenneth O. Hill, Kanata, all of Canada

[73] Assignee: Canadian Patents & Development Limited, Ottawa, Canada

[21] Appl. No.: 97,313

[22] Filed: Nov. 26, 1979

[51] Int. Cl.$^3$ .............................................. G02B 5/172
[52] U.S. Cl. .................................................. 350/96.16
[58] Field of Search ........................ 350/96.16, 96.15

[56] References Cited

U.S. PATENT DOCUMENTS

| | | | |
|---|---|---|---|
| 3,874,781 | 4/1975 | Thiel | 350/96.16 |
| 3,933,410 | 1/1976 | Milton | 350/96.16 |
| 3,936,141 | 2/1976 | Milton | 350/96.16 |
| 4,087,156 | 5/1978 | Kao et al. | 350/96.15 |
| 4,092,059 | 5/1978 | Hawkes et al. | 350/96.16 |

OTHER PUBLICATIONS

Rawson et al., "Bitaper Star Couplers with Up to 100 Fibre Channels" in *Electronics Letters*, vol. 15, No. 14, Jul. 1979.

B. Kawasaki et al., "Low-loss Access Coupler for Multimode Optical Fiber Distribution Networks" in *Applied Optics*, vol. 16, No. 7, Jul. 1977.

T. Ito et al., "Bidirectional Tapered Fiber Star Coupler" *Proc.*, 4th European Conf. on Optical Communications, Geneva, Switz., Sep. 1978, pp. 318-322.

*Primary Examiner*—John D. Lee
*Attorney, Agent, or Firm*—Edward Rymek

[57] ABSTRACT

The low-loss reflection star coupler has a bundle of multimode optical fibers which is folded on itself and fused over a predetermined length to form a bundle loop. During the fusion process, the fibers are elongated into biconical tapers in the fused section. A hybrid transmission-reflection star includes one or more further fibers having only one biconical tapered section which is fused to the fused section of the fiber bundle.

5 Claims, 3 Drawing Figures

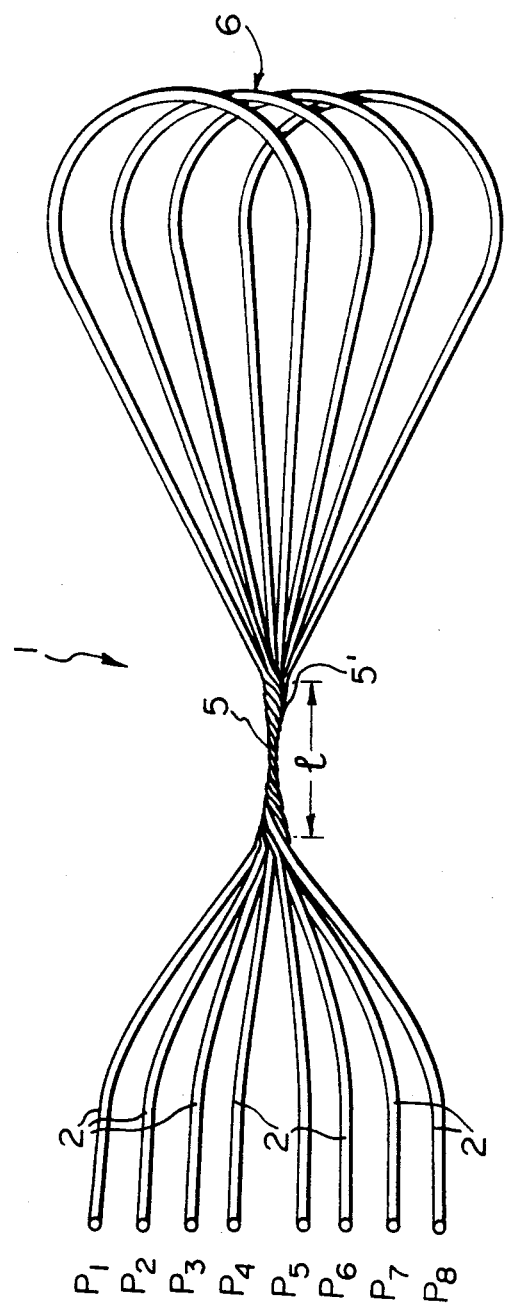
FIG. 1
FIG. 2

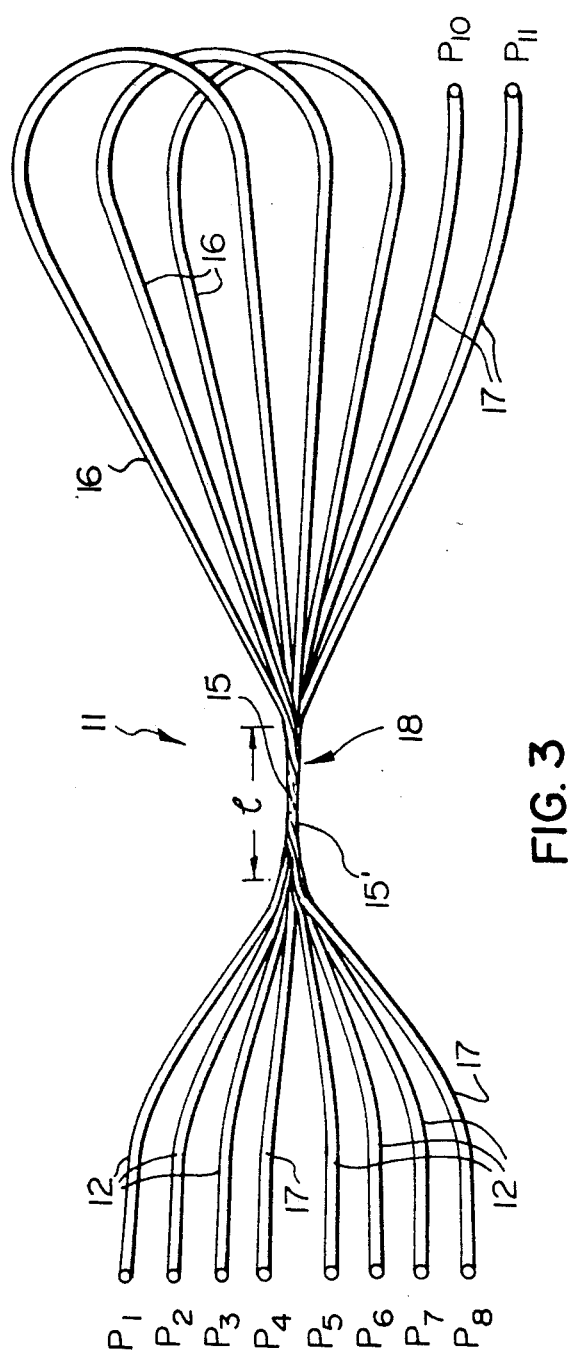

LOW-LOSS STAR COUPLERS FOR OPTICAL FIBER SYSTEMS

BACKGROUND OF THE INVENTION

This invention is directed to star couplers and in particular to reflection and hybrid transmission-reflection star couplers for distributing light coupled into any one or more ports to all of the output ports in the couplers.

A transmission star coupler is a multi-port optical device which distributes the light coupled into an input port to all of the output ports of the device, such a device is described in U.S. patent application Ser. No. 805,865 (now U.S. Pat. No. 4,291,940), filed June 13, 1977 by B. S. Kawasaki et al.; and in the publication by E. G. Rawson et al., Electronics Letters, Vol. 15, No. 14, July 5, 1979, pp. 432–433. A reflection star coupler distributes the light coupled into any one port to all of the ports of the device. Thus the input ports of a reflection star are also the output ports.

A hybrid transmission-reflection star coupler is a new type star coupler in which some of the ports function as in a transmission star coupler and the rest of the ports function as in a reflection star coupler.

Reflection star couplers are useful for implementing passively coupled fiber-optic data bus networks which interconnect a large number of terminals or nodes. In such a data-bus network implementation, each terminal is connected by a single fiber strand to a port of the reflection star couplers. A low-loss access coupler or an optical combiner located at each terminal is required to permit bidirectional transmission over the single fiber strand. The general technique for fabricating reflection star couplers is to use a mixing rod and a mirror to distribute the light among the ports of the device as described in U.S. Pat. No. 3,874,781 which issued on Apr. 1, 1975 to F. L. Thiel. U.S. Pat. No. 4,092,059, which issued on May 30, 1978 to T. Hawkes et al., teaches a device in which the mirror is replaced by a fiber bundle loop. Recently, a reflection star has been described by T. Ito et al., Proceedings of the Fourth European Conference on Optical Communications, Geneva, Sept. 12-15, 1978, pp. 318–322, in which the mixing rod has been replaced by a fused fiber taper structure. These techniques are limited to some extent by large excess loss (2.1 to 4.5 dB) and their complex fabrication procedures which result in a high cost.

SUMMARY OF THE INVENTION

It is therefore an object of this invention to provide a low loss reflection star coupler.

It is a further object of this invention to provide a low loss hybrid transmission-reflection star coupler.

It is another object of this invention to provide a method of producing the low loss reflection or hybrid star couplers.

These and other objects of this invention are achieved in a reflection star coupler comprising at least one multimode optical fiber having two biconical taper sections sequentially located along its length with each of the optical fibers folded back on itself, the two biconical tapered sections being fused to one another along a predetermined length of the tapered sections, and the fused tapered sections of all of the optic fibers being fused to one another.

In accordance with another aspect of this invention, the biconical tapered sections in each or all of the fibers may be twisted around one another.

According to yet another aspect of this invention, the reflection star coupler may further include at least one multimode optical fiber having one biconical tapered section fused to the fused tapered sections of the folded optical fibers.

In accordance with a further aspect of this invention, the core diameter of the fibers in the couplers may vary in size in order to obtain preferential coupling to certain fibers.

The method of producing a reflection star coupler in accordance with this invention consists of taking a bundle of multimode optic fibers and folding the bundle of optic fibers on itself such that a loop is formed with the bundle maintained in contact with itself, along a predetermined length. To produce a hybrid transmission-reflection star coupler, one or more of the fibers in the bundle are not folded but are held in contact with the bundle along only one part of their length. A tensile force is applied to at least the predetermined contact length of the bundle, of which a region is heated to soften the fibers in the bundle thereby elongating the contact length to form biconical tapered sections in the fibers and to fuse the fibers and the bundle to itself for a predetermined portion of the contact length. The bundle is preferably held in contact by twisting the bundle around itself for the predetermined length of the bundle.

Other objects and aspects of the invention will be clear from the detailed description of the drawings.

BRIEF DESCRIPTION OF THE DRAWINGS

In the drawings:

FIG. 1 illustrates an eight port reflection star coupler in accordance with the present invention;

FIG. 2 shows the optic fiber in cross-section; and

FIG. 3 illustrates a hybrid reflection-transmission star coupler in accordance with the present invention.

DESCRIPTION OF THE PREFERRED EMBODIMENT

FIG. 1 illustrates one embodiment of a reflection star coupler 1 in accordance with the present invention. The reflection star coupler 1 includes four optical fibers 2, each consisting of a core 3 of optically transmissive material and a cladding 4 of material covering the core 3 as shown in cross-section in FIG. 2. The fibers 2 may be either step index or graded index multimode fibers. In the structure of the star coupler 1, each of the fibers 2 have two sequentially spaced biconical tapered sections 5, $5^1$ which are fused together along a predetermined length 1 such that the fibers 2 are folded back on themselves to form folds or loops 6. The fiber loops 6 are preferably all of the same length and the loop radius should be larger than the minimum bending radius of the optical fiber used. In the tapered sections 5, $5^1$ the diameters of the fibers 2 and thus the cores 3, first narrows from the normal diameter and then widens back again to its normal diameter. As well as being fused, the tapered sections 5, $5^1$, for each fiber or for all the fibers 2, may also be twisted around one another in the fused biconical tapered section area. The reflection star coupler 1 illustrated in FIG. 1 has eight ports $P_1$, $P_2$, $P_3$, $P_4$, $P_5$, $P_6$, $P_7$ and $P_8$, which may be connected to eight different terminals, however star coupler 1 may have as few as two ports or as many as 100 ports. The fibers 2 would all normally be substantially identical in diameter as in FIG. 1, however, if preferential coupling is required into one port or another, a fiber with a larger diameter may be used for that port resulting in preferential coupling to that fiber and its ports.

In operation, light is injected into one of the ports, such as port $P_1$, as the light enters the narrowing tapered section 5, the higher order modes are forced to radiate out of the core 3 area to be guided as cladding modes. The light then crosses the fused boundaries between the biconical tapered sections 5 and $5^1$ in all of the fibers 2, and is therefore guided in the overall structure. As the light propagates beyond to the region of increasing tapers associated with the folds 6 in the fibers 2, the cladding modes propagate at gradually decreasing angles to the fiber axis and are recaptured by the tapered core sections to again become core modes in the untapered portions of the fibers. The light is propagated around the folds 6 and then reenters the biconical tapered section area again where it goes through the same procedure as discussed above, except that the light is then propagated through each fiber to its respective port $P_1$-$P_8$.

In general, the light launched into a port of the reflection star coupler will not divide up equally among the ports of the device whereas in practice the preferred reflection star design is for the condition of equal power division. Such a condition can be achieved by a suitable selection of the taper length, taper angles, and the ratio of the fiber-core diameter to the fiber-cladding diameter in the reflection star fabrication process.

The method of making an eight port reflection star coupler 1 of the type shown in FIG. 1 consists of folding four suitably chosen lengths of fiber into a four-fiber loop. The eight fiber end pieces are then carefully wrapped and twisted together in order to configure a close-packed hexagonal bundle containing eight fibers. The bundled section is then clamped in a jig and placed under spring tension. A portion of the bundle is softened and fused using an oxy-butane micro-torch flame. At the same time, the spring elongates the fibers in the softened region to form a bundle of fused biconical tapered fibers with four fiber loops 6 as shown in FIG. 1.

During the fabrication process it is useful to launch light into one fiber 2 and to monitor the amounts of light coupled into the other fibers 2. The process can be stopped when the desired coupling is achieved.

An eight port star coupler using Corning Glass Works step-index silica fiber having an 85 $\mu$m core diameter, a 20 $\mu$m cladding thickness and a numerical aperture of 0.175, was fabricated using the above method.

To evaluate the reflection star couplers performance, the light from a He-Ne laser was launched into a port $P_1$ on FIG. 1 using a $\times 50$ microscope objective to uniformly fill the modes of the fiber and the power coupled out of the other ports $P_2$-$P_8$ was measured. The results of these measurements are summarized in Table 1 below. The ports of the coupler are labelled such that ports $P_1$, $P_2$, $P_3$ and $P_4$ correspond to ends of the same fiber as ports $P_5$, $P_6$, $P_7$ and $P_8$, respectively. To completely characterize the reflection star, it is also generally necessary to determine the power reflected out of the input port $P_1$. Since this quantity is difficult to measure directly, it was assumed that the light power reflected out of port $P_1$ is the average power coupled out of all other ports but excluding the power coupled out of that port $P_5$ which terminates the same fiber as the input port $P_1$. This average value which is 0.47 mw is shown enclosed in parentheses in Table 1.

TABLE 1

| | Reflection Star Coupling Performance | | |
|---|---|---|---|
| Port Number | Input Power (mw) $I_j$ | Output Power (mw) $P_i$ | Coupling Ratio $\frac{P_i}{I_j} \times 100$ |
| $P_1$ | 4.85 | (0.47) | 9.7 |
| $P_2$ | — | 0.5 | 10.3 |
| $P_3$ | — | 0.525 | 10.8 |
| $P_4$ | — | 0.42 | 8.7 |
| $P_5$ | — | 0.855 | 17.6 |
| $P_6$ | — | 0.43 | 8.9 |
| $P_7$ | — | 0.44 | 9.1 |
| $P_8$ | — | 0.53 | 10.9 |

The performance parameters that characterize a reflection star coupler are the excess loss, the coupling ratios and the percent standard deviation in the coupling ratio. The excess loss in dB is defined as $$10 \log_{10} \sum_{i=1}^{N} \frac{P_i}{I_j}$$

where $P_i$ is the power coupled out port i, $I_j$ is the power coupled into port j and N is the number of ports. Using the results listed in Table 1, the excess loss of our eight port reflection star coupler is calculated as 0.66 dB. The coupling ratio $C_{ij}=P_i/I_j$ is the fraction of power coupled from the launching port j to port i and is expressed as a percent for each port in Table 1. The average coupling ratio for the coupler is $C_o=10.8\%$. A measure of the uniformity of the power reflected out of the star coupler is the dispersion $\sigma$ in the coupling ratios which is defined as $$\sigma = \sqrt{\frac{1}{N-1} \sum_{i=1}^{N} (C_{ij} - C_o)^2}$$

The above device showed a percent standard deviation ($100 \times \sigma/C_o$) in the coupling ratios of 27%.

A further embodiment of the reflection star coupler 11 in accordance with the present invention is shown in FIG. 3. In addition to having a number of fibers 12 folded on themselves, to form loops 16, this hybrid reflection star coupler also has one or more fibers 17 which has one biconical tapered section 18 which is fused together with the sequential tapered sections 15 and $15^1$ in each of the fibers 12. In such a device 11, ports $P_1$ to $P_8$ function like the ports of a reflection coupler 1 whereas ports $P_{10}$ and $P_{11}$ function like the port of a transmission star coupler. In this particular coupler, ports $P_1$, $P_2$, $P_3$, $P_4$ and $P_8$ correspond to the ends of the same fiber as ports $P_5$, $P_6$, $P_7$, $P_{10}$ and $P_{11}$, respectively.

The transmission-reflection hybrid star coupler 11 can be interconnected together to form distributed star networks.

Once again, in the hybrid coupler, the diameters of all of the fibers 12 and 17 need not be identical, and in particular it may be advantageous in certain applications if fiber 17 has a diameter greater than the diameter of fibers 12 in order to carry a large percentage of the input energy through the reflection star coupler to the next bus in a network.

Many modifications in the above described embodiments of the invention can be carried out without departing from the scope thereof and, therefore, the scope of the present invention is intended to be limited only by the appended claims.

We claim:

1. A hybrid reflection star coupler comprising: at least one multimode optical fiber having two biconical tapered sections sequentially located along its length and at least one multimode optical fiber having one biconical tapered section along its length, all of the tapered sections of the two biconical section fibers and the one biconical section fibers being fused together along a predetermined length of the tapered sections, with each of the two biconical section fibers being folded back on itself and each of the one biconical section fibers forming an optical path through the coupler.

2. A hybrid reflection star coupler comprising: at least one multimode optical fiber having two biconical tapered sections sequentially located along its length and at least one multimode optical fiber having one biconical tapered section along its length, all of the tapered sections of the two biconical section fibers and the one biconical section fibers being twisted around one another and fused together along a predetermined length of the tapered sections, with each of the two biconical section fibers being folded back on itself, and each of the one biconical section fibers forming an optical path through the coupler.

3. A hybrid reflection star coupler as claimed in claim 1 or 2 wherein one or more of the one biconical section fibers has a diameter greater than the diameter of the two biconical section fibers.

4. A method of producing a hybrid reflection star coupler from a plurality of multimode optical fibers comprising:
    (a) folding at least one of the optical fibers on itself such that a loop is formed with the fiber in contact with itself along a predetermined length;
    (b) placing at least one further optical fiber in contact with the folded fiber along the predetermined contact length;
    (c) applying a tensile force to at least the predetermined contact length of the fibers; and
    (d) heating a region of the contact length of the fibers to soften the fibers thereby elongating the contact length to form biconical tapered sections in the fibers and to fuse the fibers for a predetermined portion of the contact length.

5. A method as claimed in claim 4 wherein step (c) includes twisting the fibers around one another at least in the predetermined contact length.

* * * * *